Oct. 10, 1967
S. D. BEARMAN
3,345,709
SELECTIVELY ENGAGEABLE AND DISENGAGEABLE FASTENER MEANS
Filed Jan. 12, 1966
2 Sheets-Sheet 1
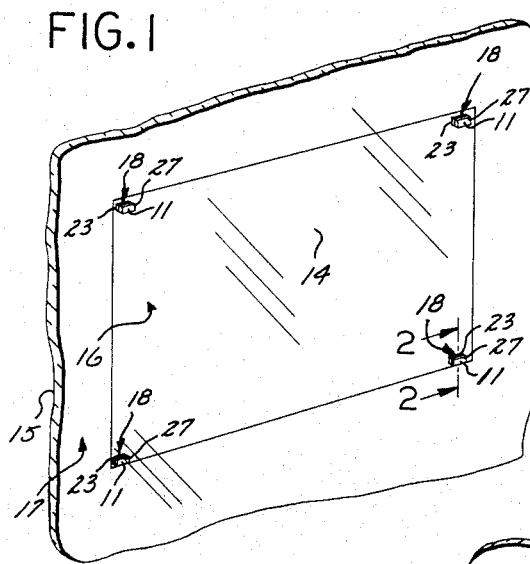
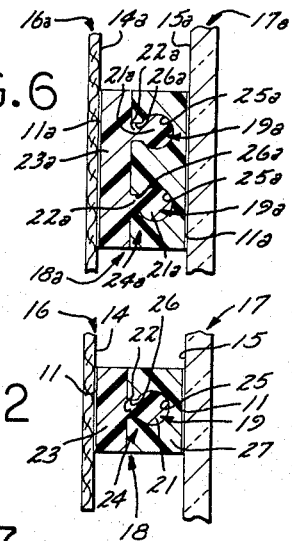
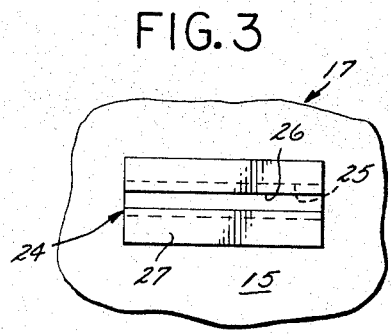
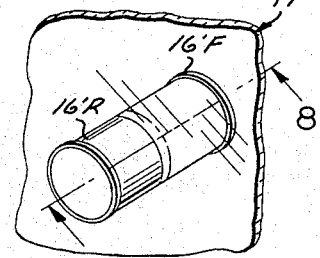
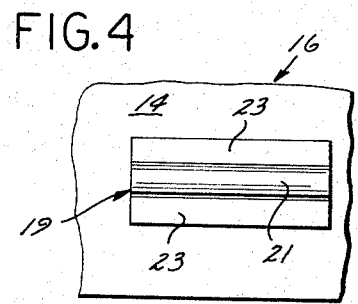
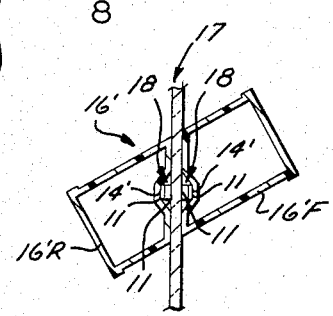
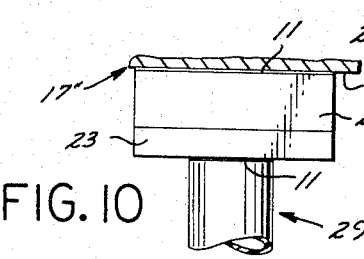
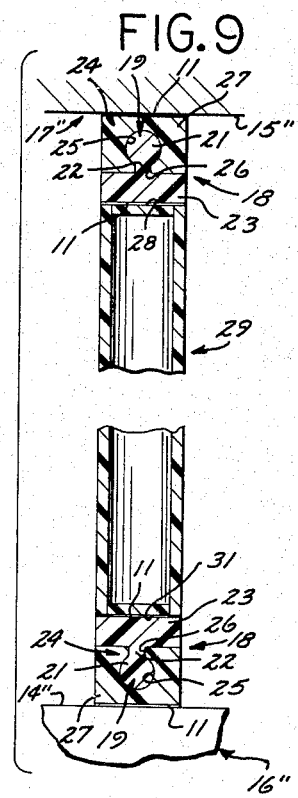
INVENTOR.
SUMNER D. BEARMAN Oct. 10, 1967     S. D. BEARMAN     3,345,709
SELECTIVELY ENGAGEABLE AND DISENGAGEABLE FASTENER MEANS
Filed Jan. 12, 1966     2 Sheets-Sheet 2
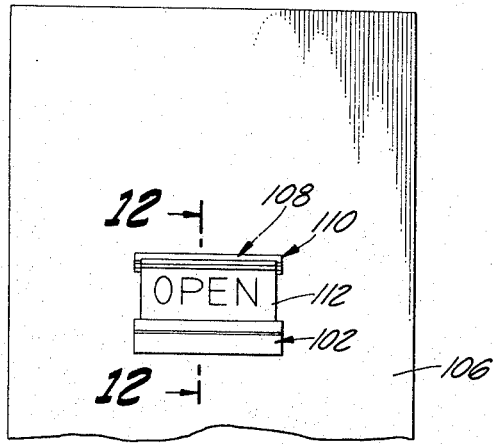
FIG. 11.
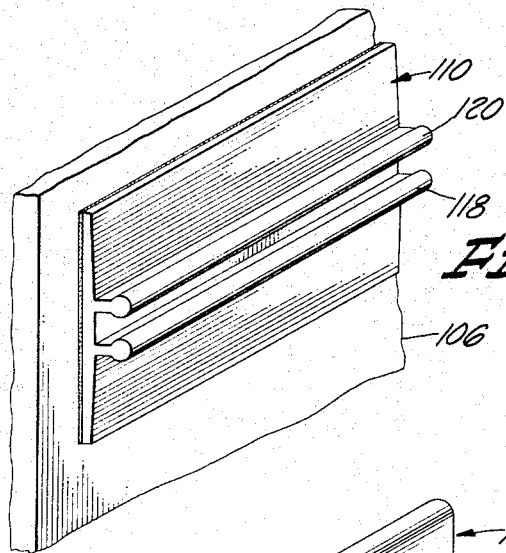
FIG. 13.
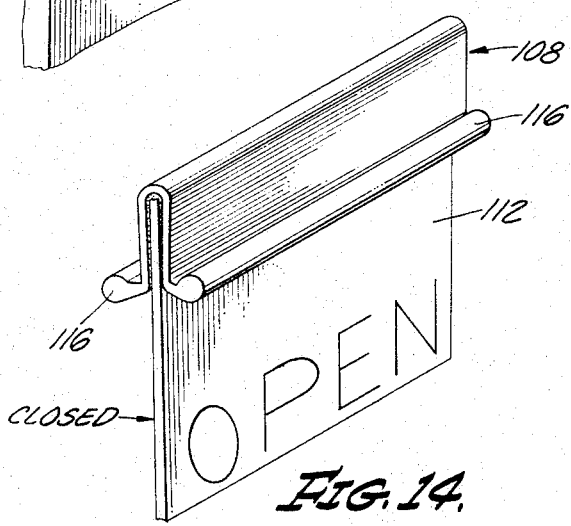
FIG. 14.
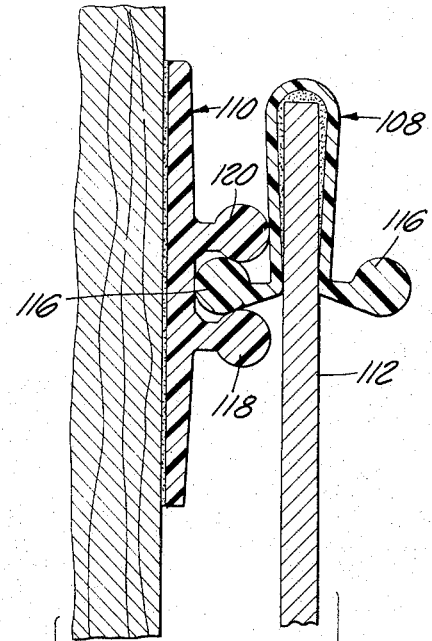
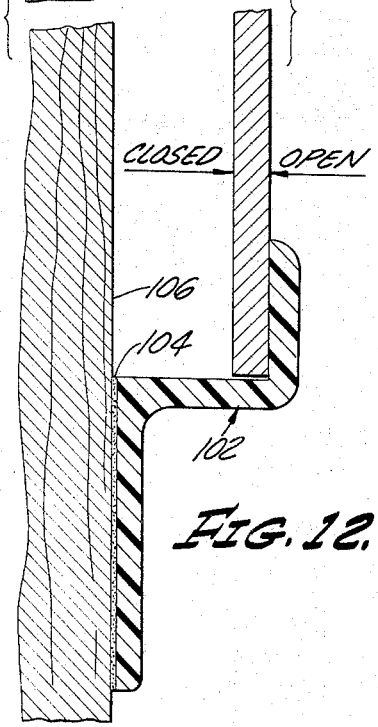
FIG. 12.
INVENTOR.
SUMNER D. BEARMAN
BY Lyon & Lyon
ATTORNEYS

United States Patent Office 3,345,709
Patented Oct. 10, 1967

3,345,709
SELECTIVELY ENGAGEABLE AND DIS-ENGAGEABLE FASTENER MEANS
Sumner D. Bearman, Los Angeles, Calif., assignor to Space Ad Company, Los Angeles, Calif., a corporation of California
Filed Jan. 12, 1966, Ser. No. 532,025
9 Claims. (Cl. 24—208)

This application is a continuation-in-part of abandoned application Ser. No. 346,130, filed Feb. 20, 1964, the disclosure of which is expressly incorporated herein by reference.

Generally speaking, the present invention relates to the fastener art and, more particularly, pertains to a selectively engageable and disengageable fastener means which, in one exemplary form of the invention, may be used for fastening a sign or other display member in a selected relationship relative to a supporting member.

In certain applications of the invention, the above-mentioned supporting member may comprise a light-transmissive member, such as a window made of glass, transparent or translucent plastic, or any other suitable light-transmissive material, and the above-mentioned sign or display member may be mounted either in front of said transparent window or behind said transparent window for viewing through the front thereof, if desired. In this application of the invention, the novel selectively engageable and disengageable fastener means of the present invention provides a very effective arrangement for quickly and easily mounting such signs or display members with respect to such window surfaces and for interchanging and replacing same with other signs or display members without the usual difficulties encountered in the conventional prior art practice of mounting such signs, which frequently involves employing tape or other fastening means mounted across the corners or along edges of the sign for adhesively affixing it to the surface of the window, either in front of the window or behind the window. This prior are sign mounting technique is relatively time consuming and inconvenient, whereas the novel selectively engageable and disengageable fastener means of the present invention makes it possible to mount and/or dismount a sign with respect to a window in a matter of seconds and with practically no inconvenience being involved.

It should also be noted that the novel selectively engageable and disengageable fastener means of the present invention is particularly well adapted for mounting three-dimensional displays relative to such an auxiliary mounting surface, such as a transparent window or the like and, in certain preferred arrangements, this may comprise the mounting of a portion of said three-dimensional display behind the surface of the window and the mounting of another portion of said three-dimensional display in front of the window so as to apparently pass completely through the window in an eye-catching fashion. Furthermore, it should be noted that this type of three-dimensional window-mounted display can be seen at virtually any incident angle with respect to the surface of the window and viewing is not limited to a narrow angular field directly in front thereof as is the case with a conventional window sign.

It should also be noted that the novel selectively engageable and disengageable fastener means of the present invention may also be adapted for use in conveniently mounting hanging displays and/or signs which may be supported from overhead locations, such as the ceiling of a store or the like, and which may carry hanging displays or signs at any convenient height, such as directly over market display counters or gondolas in a grocery store or the like, in the upper surface region which is conventionally unused and wasted. This application of the present invention makes it possible to use said upper surface region above conventional display counters in a highly efficient and effective manner, as well as making it possible for a prospective patron of a store to quickly visually determine where a display or counter location can be found carrying the merchandise in which he is interested.

With the above points in mind, it is an object of the present invention to provide a novel selectively engageable and disengageable fastener means of the character referred to hereinbefore in combination with an auxiliary member, such as a display member and/or sign member or the like, and in combination with an auxiliary supporting member, such as the surface of a window or the like, for the purposes outlined above, and also to provide just the selectively engageable and disengageable fastener means of the invention, individually or per se, as a sub-combination of the complete combination form just referred to.

It is a further object of the present invention to provide novel fastener means of the character referred to above, which greatly facilitates the mounting of an auxiliary object, such as a three-dimensional display and/or a sign or the like with respect to an auxiliary supporting surface, such as the surface of a window, a wall surface, an overhead ceiling surface, or any other suitable supporting surface so as to maximize the speed of the mounting operation and also the dismounting operation and so as to minimize the inconvenience and labor conventionally involved in performing an equivalent operation.

It is a further object of the present invention to provide a novel fastener means of the character referred to herein, which is of a construction such as to inherently provide a very strong and relatively stable engagement between the member to be mounted and the supporting member.

It is a further object of the present invention to provide selectively engageable and disengageable fastener means of the character referred to herein, embodying any or all of the features referred to herein, generically or specifically, individually or in combination, and which is of relatively simple, inexpensive, easy-to-use, and easy-to-manufacture construction such as to be capable of mass production at relatively low cost whereby to be conducive to widespread use thereof.

Further objects are implicit in the detailed description which follows hereinafter (which is to be considered as exemplary of, but not specifically limiting, the present invention) and said objects will be apparent to persons skilled in the art after a careful study of the detailed description which follows hereinafter.

For the purpose of clarifying the nature of the present invention, several exemplary embodiments and applications of the invention are illustrated in the hereinbelow-described figures of the accompanying drawings and are description which follows hereinafter.

FIGURE 1 is a perspective view illustrating one exemplary form of the present invention when employed for the purpose of mounting an auxiliary member comprising a sign in a selected relationship parallel to and closely adjacent to a transparent window member, which is shown fragmentarily for space conservation reasons.

FIGURE 2 is an enlarged fragmentary sectional view, taken in the direction of the arrows 2—2 of FIGURE 1.

FIGURE 3 is a front elevational view of the female one of the two engagement elements of the intermediate resilient engagement means of FIGURE 2 with the male element thereof removed for reasons of drawing simplification and clarity. The auxiliary member to which said engagement element is adhesively affixed is shown fragmentarily in this view for space saving reasons.

FIGURE 4 is a view similar to FIGURE 3, but comprises an elevational view of the other or male engagement element of the two elements of the intermediate resilient engagement means of FIGURE 2.

FIGURE 5 is a reduced size fragmentary perspective view illustrating the fact that the adhesive surface fastening means carried by the outer surface of each of the two intermediate resilient engagement elements is initially covered by protective and controllably removable covering tape means to protect the adhesive surface thereof. It should be understood that the other engagement element is similarly provided with protective covering tape means.

FIGURE 6 is a fragmentary sectional view generally similar to FIGURE 2, but illustrates a slight modification of the invention.

FIGURE 7 is a reduced-size fragmentary perspective view illustrating one application of the novel fastener means of the present invention wherein it mounts front and rear portions of a three-dimensional display object simulating a food or soup can on a window in a manner wherein said three-dimensional can-simulating display apparently passes completely through the window.

FIGURE 8 is a sectional view, taken in the direction of the arrows 8—8 of FIGURE 7, and illustrates the positioning of the pair of fastener means of the present invention which mount the front and rear portions of the can-simulating three-dimensional display on the front and rear surfaces of the transparent window.

FIGURE 9 is an enlarged fragmentary sectional view, with a central portion broken away, of a further slightly modified application of the novel fastener means of the present invention wherein it is employed for mounting a hanging display or sign from an overhead auxiliary support, such as a ceiling or the like.

FIGURE 10 is a fragmentary elevational view of the upper portion of FIGURE 9.

FIGURE 11 is a side elevational view of another novel fastener means of the present invention wherein it is employed for mounting a sign on a window or door.

FIGURE 12 is a sectional view taken along the line 12—12 in FIGURE 11.

FIGURE 13 is an enlarged perspective of one portion of the fastener means shown in FIGURES 11 and 12.

FIGURE 14 is an enlarged perspective view of the second part of the fastening means utilized in FIGURES 11 and 12. As shown in FIGURE 14, the fastening means element is positioned on the upper edge of a sign or card adapted to be utilized on a door, window, or other surface.

Generally speaking, the exemplary first form of the invention illustrated in FIGURES 1–5 comprises a pair of oppositely directed adhesive surface fastening means 11 which are preferably of the pressure-sensitive type adapted to become very firmly adhesively engaged with any smooth flat surface when pressed thereagainst and which are also preferably initially protected by protective covering tape means, such as that shown at 12 and 13 in FIGURE 5—it being understood that each adhesive surface 11 is provided with similar protective covering tape means 12 and 13 initially before use.

It will be noted that the protective covering tape means 12 and 13 overlap at the center so that the inner tape ends 12E and 13E can be sequentially digitally grasped for the purpose of applying force thereto in order to forcibly remove the protective tape covers 12 and 13, which will leave exposed a fresh surface of the pressure-sensitive adhesive fastening means 11 for application to the smooth surfaces 14 and 15 of first and second auxiliary members indicated generally at 16 and 17, respectively.

It will be noted that, in the exemplary first form of the invention illustrated, said first auxiliary member 16 is shown as comprising a sign while said second auxiliary member 17 is shown as comprising a transparent window. However, it should be clearly noted that these showings are exemplary only, and said first and second auxiliary members are not specifically so limited in all forms of the invention, both as to structure and relative position thereof.

It should also be noted that the selectively engageable and disengageable fastener means of the present invention also comprises selectively engageable and disengageable intermediate resilient engagement means positioned between the pair of adhesive surface fastening means 11 and indicated generally by the reference numeral 18. In the exemplary first form of the invention illustrated, said intermediate resilient engagement means 18 comprises a mating pair of selectively separable resilient engagement elements, each firmly connected respectively relative to a different one of the pair of adhesive surfaces 11 and being inwardly directed away therefrom toward the other one of said mating resilient engagement elements when in engaged relationship with respect to each other such as is best shown in FIGURE 2.

In the exemplary first form of the invention illustrated, one of said two separable resilient engagement elements comprises an inwardly projecting resilient engagement element indicated generally at 19 having a substantially cylindrically shaped enlarged retaining bead portion 21 carried at the inward, forward edge thereof and laterally elongated along the entire lateral length thereof, and having a reduced-size interconnecting web portion 22 extending outwardly from said enlarged retaining bead portion 21 and provided at the outer extreme thereof with a laterally elongated base portion 23 bearing one of said adhesive surface fastening means 11 of the pair thereof along the outer surface of said base portion 23, as is best shown in FIGURE 2.

It should also be noted that in the exemplary first form of the invention illustrated, the other one of said mating pair of selecively separable resilient engagement elements comprises an inwardly, forwardly extending laterally elongated receiving member indicated generally at 24 and having and defining therein a substantially cylindrically shaped laterally elongated receiving recess means 25 and having positioned immediately forwardly, inwardly thereof a reduced-size resiliently enlargeable laterally elongated receiving slot 26 normally facing said laterally elongated retaining bead portion 21 for the forcible resilient reception thereof through said reduced-size laterally elongated entry slot 26 into said laterally elongated cylindrically shaped receiving recess 25 whereby to firmly resiliently lock said laterally elongated projecting resilient engagement element 19 and said laterally elongated receiving member 24 together in the manner clearly shown in FIGURES 1 and 2 until forcibly disengaged.

It should be noted that said laterally elongated receiving member 24 is provided outwardly of said receiving recess 25 with a laterally elongated base portion 27 bearing the other one of said adhesive surface fastening means 11 of said pair thereof along the other surface of said base portion 27 for said adhesive engagement with the surface 15 of the transparent window 17, in the manner most clearly shown in FIGURE 2.

Generally speaking, at least one of the two engagement elements, such as the exemplary ones shown at 19 and 24 in the exemplary first form of the invention illustrated, is of a resilient nature capable of forcible resilient deflection whereby to allow engagement and disengagement of the engagement elements 19 and 24 for the purposes of the present invention as referred to hereinbefore. In the exemplary first form of the invention illustrated, the required resiliency is provided primarily by reason of the fact that the receiving member 24 is made of a resiliently deflectable elastomeric material (in the example illustrated, comprising a plastic material, although not specifically so limited in all forms of the invention). This obviously provides an arrangement such that inward forcing movement of the enlarged bead portion 21 of the male engagement element 19 will result in its being forced through the smaller width entry slot 26, which merely becomes enlarged to the required degree by deflection of the upper and lower portions of the receiving member 24 to allow the entry of the enlarged bead or rim 21 of the male engagement element 19 into the receiving recess 25.

The disengaging operation comprises the reverse of the above-described operation and is again permitted by effective enlargement of the slot 26 made possible by reason of the resilient nature of the receiving member 24.

In the exemplary first form of the invention illustrated, the male engagement element 19, including the enlarged laterally elongated bead 21 is also made of elastomeric material and this may additionally provide some small measure of resilient deflection to facilitate the engaging and disengaging operations just referred to above.

In the exemplary first form of the invention illustrated, each of the two engagement elements 19 and 24 is substantially completely made of elastomeric plastic material which, not only provides the resiliency referred to above, but which also provides a relatively inexpensive and simple construction capable of being produced by extrusion and cutoff operations and/or molding operations which makes for extremely inexpensive, low cost production with respect to capital investment in tooling, dies, and equipment, and also which makes for extremely low cost per unit production for the finished article. However, in certain forms of the invention, either or both of the engagement elements 19 and 24 may be made of various other suitable materials.

The operation of the exemplary first form of the invention may be briefly described as follows. Either one of the two engagement elements 19 and 24 may have its adhesive surface fastening means 11 pressed against and fastened to a smooth surface, such as the surface 15 of the glass or other type of transparent window 17, while the adhesive surface fastening means 11 of the other of said two engagement elements is similarly pressed against another smooth surface, such as that shown at 14, of the sign 16, and the two engagement elements 19 and 24 are positioned in engaged relationship such as is best shown in FIGURE 2. This is done with respect to any desired number of the complete fastener means of the present invention, such as at four locations clearly shown in FIGURE 1, for example, which provides a very firm and stable and yet readily and quickly engaged and disengaged mounting for the sign 16 with respect to the window 17.

However, it should be noted that the invention is not limited to any particular number of such usages of the complete fastener means of the present invention, such as the four shown in FIGURE 1, but is intended to include one or more such embodiments of the present invention used for purposes similar to that shown in FIGURE 1, whether the sign 16 is positioned behind the window 17 as is shown in FIGURE 1 for viewing through the window or is positioned in front thereof, or whether employed for mounting an auxiliary member other than the sign 16 and, in certain cases, with respect to various different types of supporting members other than the transparent window shown in FIGURES 1 and 2.

It will be noted that the lateral elongation of the enlarged bead or lip 21 of the male engagement element 19 and the corresponding lateral elongation of the receiving recess 25 and entry slot 26 provide a very strong and stable type of engagement which makes it possible to use even a single fastener means for mounting an auxiliary member with respect to a supporting member without any likelihood of relative rotation of the auxiliary member with respect to the supporting member occurring in substantially parallel planes. In other words, the novel fastener means of the present invention provides great fastening strength and great stability at one and the same time and in a very simple, inexpensive, and easy-to-manufacture construction.

Incidentally, it should be noted that reference to the enlarged bead or lip 21 of the male engagement element 19 and the similar reference to the lateral elongation of the receiving recess 25 of the female engagement element 24, and the lateral elongation of the slot 26, are not intended to limit same to being horizontally directed as is shown in the drawing and as is particularly clearly shown in FIGURES 3 and 4. The term "lateral" and any related terms, as used in connection therewith, are merely intended to mean lateral with respect to the cross-sectional planes thereof as shown in FIGURE 2 and might be horizontally directed, vertically directed, or angularly directed in any orientation therebetween, and said expression and related expressions are to be so construed.

It should be noted that, as pointed out above, the manufacture of the exemplary first form of the invention is extremely simple since it is only necessary to provide two extrusion dies shaped in accordance with the cross-sectional configuration of the male engagement element 19 (including the base 23) and the female engagement element 24 (including the base 27) as is best shown in FIGURE 2. The plastic elastomeric resilient material, or other equivalent type of material, may then be extruded through said dies to any desired length whereby to provide two long strips of material each having a cross-sectional configuration corresponding to a different one of said two engagement elements 19 and 24 and the base portions 23 and 27 thereof, respectively. These two strips of material may then be cut off to any desired length.

The pressure-sensitive adhesive material comprising the adhesive surface fastening means 11 may be applied to the outer surfaces of said two strips either before or after said cutoff operation and the protective tapes 12 and 13 may be applied thereto in those forms of the invention employing same. It will readily be understood that this provides an extremely simple and inexpensive type of production operation which will make the fasteners of the present invention available in such great volume and at such low cost as to be conducive to use of the novel fasteners of the present invention for a great variety of purposes—indeed, wherever any type of fastening of two elements in closely adjacent substantially parallel relationship is desired in a manner generally similar to that described herein. For example, automobile inside door panels might be fastened to the remainder of the door along the edges thereof, by the fastener means of the present invention merely made somewhat longer and of a length and shape such as to fit the edge contours of the door panel, and various types of fastening applications of the novel fastener means of the present invention of this general type, where removal of at least one of the fastened structures may be desired at some subsequent time, are all intended to be included and comprehended within the broad scope of the present invention.

It should be noted that the cutoff operation referred to above need not necessarily be performed by the manufacturer of the fastener means, but may actually be performed by a user thereof. In other words, the two extruded strips of material referred to above may be supplied to a purchaser either in lengthy strips or in rolls thereof, either with or without a continuous protective backing tape covering the pressure-sensitive adhesive comprising the adhesive surface fastening means 11 thereof, and the ultimate user of the product, at the point of use thereof, may unroll or measure off a desired length of each of the two different types of strip material and may similarly cut them off to the same measured lengths, then remove the backing and protective tape therefrom and fasten them to the surfaces of the auxiliary supporting member and the auxiliary member which is to be supported and may resiliently engage the male and female portions of the resilient engagement means 18 together in a relationship which would cross-sectionally look precisely like that shown in FIGURE 2. In other words, in this arrangement, the ultimate user of the invention will actually cut the fastener means to the proper size for his intended use thereof just prior to use.

FIGURE 6 illustrates a very slight modification of the present invention, and similar parts are indicated by similar reference numerals, followed by the letter "a," however. In this modification of the invention, it will be noted that all elements are substantially the same as in the first form of the invention except for the fact that the male engagement element comprises a pair of inwardly, forwardly extending laterally elongated projection members 19a, each having an enlarged retaining bead portion 21a similar to that of the first form of the invention shown at 21, while the female engagement element 24a is similarly provided with a pair of laterally elongated receiving recess means 25a similar to the single one shown at 25 in the first form of the invention. This merely increases the strength and stability of the resilient engagement means 18a of a given lateral length and may be desirable in certain circumstances rather than increasing the lateral length of the resilient engagement means 18a to provide the same degree of strength and stability.

In other words, space limitations may indicate the desirability of using a modified form of the invention, such as is shown in FIGURE 6, rather than a longer version of the first form of the invention, such as is shown in FIGURES 1–5.

Incidentally, in this connection, it should be noted that any desired multiple of the laterally elongated projecting retaining bead portions 21a and corresponding receiving recesses 25a may be provided. In other words, the invention is not limited to the single lateral form shown in FIGURES 1–5 or the double lateral form shown in FIGURE 6, but may have any number of such parallel lateral mating engagement elements, as desired.

FIGURES 7 and 8 merely illustrate a slightly different application of the first form of the invention shown in FIGURES 1–5 wherein it mounts a different type of auxiliary member from the sign 16 of the first form of the invention. Therefore, since the device is the same in this modification, it is indicated by the same reference numerals, as is the window 17.

However, since the auxiliary member mounted by the apparatus is different, it is indicated generally by the reference numeral 16' and comprises a can-simulating three-dimensional display which may simulate any type of can of merchandise, such as a soup can or any other type of can desired, which includes a forward portion 16'F and a rear portion 16'R, each of which has an inner surface portion 14' functionally similar to the surface 14 of the sign 16 of the first form of the invention illustrated in FIGURES 1–5 and adapted to be fastened to the corresponding outwardly directed adhesive surface fastening means 11 of the corresponding resilient fasteners 18 which have the inner adhesive surfaces 11 thereof fastened to opposite surfaces of the transparent window 17, in a manner similar to the cementing of the adhesive surface fastening means 11 in the first form of the invention to just one surface 15 of the window 17.

Otherwise, the two fastener means shown in FIGURE 8 are identical to the form illustrated in the first version of the invention illustrated in FIGURES 1–5 and, therefore, will not be described again in detail.

It will be noted that this arrangement effectively mounts the forward can-simulating portion 16'F and the rear can-simulating portion 16'R in aligned positions such that the entire can-simulating three-dimensional display object 16' apparently is mounted in a manner passing through the window 17 and in a way such that it can be seen from both sides of the transparent window 17 and, in fact, from almost any angular relationship relative thereto. This provides a very effective display mounting adapted to catch the eye of a potential market customer or the like and to capture his attention, which is the primary purpose of such a display.

FIGURES 9 and 10 illustrate a further slightly modified application of the invention, with the fastener means remaining the same as in the first form of the invention illustrated in FIGURES 1–5. Therefore, each of the two fastener means shown in this modified application of the invention, and the parts thereof, are designated by the same reference numerals as employed in the first form of the invention. However, other elements relating to the modified mounting application of each of said two fasteners and functionally equivalent to elements shown in the earlier form of the invention are designated by similar reference numerals, doubly primed, however. In this modification it will be noted that there are two fastener means employed, an upper one and a lower one, and the upper fastener means has one of its adhesive surface fastening means 11 (the upper one) placed in fastening relationship with a surface, such as that shown at 15", of an auxiliary supporting member, such as that shown at 17" and functionally equivalent to the window 17 of the first form of the invention since it comprises a supporting form of the invention, although in all other respects it differs from the window 17 of the first form of the invention since it is vertically overhead and is not transparent. In other words, it is functionally equivalent only in that it acts as a supporting member for the upper resilient engagement means 18, which has its other or lower adhesive surface fastening means 11 pressed against an upper end surface 28 of a longitudinal intermediate connecting member 29, which has its lower end surface 31 pressed against the upper adhesive surface fastening means 11 of the lower resilient engagement means 18, which, in turn, has its lower adhesive surface fastening means 11 pressed against the upper surface 14" of an auxiliary member, indicated generally at 16", which is adapted to be supported by the apparatus.

It should be clearly noted that the auxiliary member 16" is functionally equivalent to the sign member 16 of the first form of the invention only in that it comprises an auxiliary member which is adapted to be supported by the apparatus. In other respects, it differs therefrom, since it is not supported in laterally adjacent relationship with respect to the supporting member 17", but is supported therebelow in depending relationship thereunder. However, it is functionally equivalent in that it does comprise an auxiliary supported member and, therefore, the upper surface 14" thereof is functionally equivalent to the surface 14 of the sign 16 of the first form of the invention.

It will be noted that this modified application of the invention merely comprises the use of two of the novel complete fastener means of the present invention and the placing therebetween of the longitudinal depending interconnection member 29, which may be of any desired length so that the auxiliary member 16" (which may)

comprise a sign, a three-dimensional display or any other desired object) may be supported at any desired height below the supporting ceiling 17''.

For example, this type of arrangement may be very effectively used in markets or stores for hanging a sign or three-dimensional display, or the like, in a region above counters and other conventional display areas where space is normally wasted in such stores. This will make it possible for a customer or patron to see the auxiliary supported member 16'', which may comprise a sign or three-dimensional display, because it is positioned above the large number of counters and display shelves, gondolas, or the like, conventionally found in a store. This provides a highly advantageous arrangement since a multiplicity of such auxiliary signs or three-dimensional displays 16'' can be positioned at various elevated locations throughout the conventionally wasted upper surface regions of a store having a large floor surface in a manner such that a patron may be able to see almost all of them, or at least a great many of them, from any given location in the store.

In practice, the longitudinal interconnecting member 29 may be a hollow longitudinal plastic tubing such as is conventionally known as "spaghetti" tubing, or any other equivalent structure capable of functioning for the purposes of the present invention as outlined above. Furthermore, the means for fastening the longitudinal interconnecting member 29, in any of the multiple forms which it may assume, may be modified so as to comprise any of various types of fastening means in lieu of the lower adhesive surface fastening means 11 of the upper resilient engagement means 18 and in lieu of the upper adhesive surface fastening means 11 of the lower resilient engagement means 18, shown in FIGURE 9. For example, the longitudinal interconnecting member 29 may merely comprise a length of string, rope, wire, or any other suitable type of longitudinal tensile member, which may be tied to the corresponding upper and lower base portions 23 of FIGURE 9 by passing said string through a hole which may be provided in each of said base members 23 or by fastening the upper and lower ends of said string to any suitable fastening projection (which may be apertured in certain cases) carried by said upper and lower base portions 23, of FIGURE 9. Indeed, any suitable fastening means for fastening the upper and lower ends of said string or other longitudinal tensile member may be substituted for the corresponding adhesive surface fastening means 11 shown in FIGURE 9 as fastening upper and lower ends of the spaghetti tubing 29 to said upper and lower base portions 23. In such a modified arrangement it will, of course, be understood that the modified longitudinal interconnecting member 29 (which, as pointed out above, may comprise string, cord, or any other suitable longitudinal tensile member) will merely comprise an intermediate extension of said composite double ended resilient engagement portion which, together with the upper and lower recessed engagement elements 24, will comprise one modified composite resilient engagement means 18 rather than the two resilient engagement means shown in FIGURE 9.

Also, it should be noted that the relative positioning of male and female engagement elements can be reversed and modified as desired in this modified application of the invention, as well as in various other applications of the invention.

As shown in FIGURE 11, the fastener means of the present invention may also be utilized in conjunction with a wind strip 102. The wind strip is also adhered by adhesive 104 to any surface 106 such as a door or window. As shown more completely in FIGURES 12 through 14 the fastening means of the present invention may comprise elements 108 and 110. These elements are adhesively adhered to surfaces 112 and 106 respectively. The element 108 comprises a U-shaped portion which fits over the top of the sign (or other surface) 112, to be suspended or held in place. Extending from the lower ends of the U-shaped portion on either side thereof are enlarged retaining beads 116 each having reduced size interconnecting web portions. These retaining beads 116 are used one at a time. Thus, it is apparent that the sign 112 may be rotated 180° and held by the other of the retaining beads 116. This permits greater flexibility in the use of the fastener means of the present invention. The element 110 functions as a receiving member for either of the beads 116, and is provided with two beads 118 and 120 having interconnecting reduced size portions. The beads 118 and 120 are so positioned with respect to each other as to provide a receiving access for either of the beads 116 since these two beads are resilient laterally whereby the beads 116 may be received therebetween to firmly lock elements 108 and 110 together.

The invention further comprises the combination shown in FIGURES 11 through 14 in conjunction with wind strip 102. This wind strip is normally positioned on the surface 106 so as to receive the lower end of surface 112 to prevent wind or other force from rotating surface 112 outwardly from surface 106 when it is retained in place by the reception of bead 116 between beads 118 and 120. It will be apparent that element 102 need not have the angularity shown in FIGURE 2 since the wind strip may, for example, be curved in shape.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A selectively engageable and disengageable fastener means comprising: a pair of adhesive surface fastening means, each cooperable for adhesive fastening with respect to a surface portion of a corresponding different one of two auxiliary members which are adapted to be mounted in a desired relationship with respect to each other; and selectively engageable and disengageable intermediate resilient engagement means positioned between said pair of adhesive surface fastening means and comprising a mating pair of selectively and resiliently separable engagement elements, each firmly connected, respectively, relative to a different one of the pair of adhesive surface fastening means and being inwardly directed toward the other of said mating engagement elements when in said engaged relationship with respect to each other; wherein one of said inwardly directed engagement elements comprises an inwardly, forwardly extending laterally elongated projection member having an enlarged retaining bead portion carried at the inward, forward edge thereof and laterally elongated along the lateral length thereof and having a reduced-size interconnecting web portion extending outwardly from said bead portion and provided at the outer extreme thereof with a first laterally elongated base portion bearing one of said adhesive surface fastening means of said pair thereof along the outer surface of said first base portion, the other of said inwardly directed engagement elements comprising an inwardly, forwardly directed laterally elongated receiving member having and defining therein an enlarged laterally elongated receiving recess and having positioned immediately forward, inward thereof a reduced-size resiliently enlargeable laterally elongated slot normally facing said bead portion for the forcible resilient reception thereof through said slot into said recess and positioned outward adjacent to said slot whereby to firmly and resiliently lock said projection member and said receiving member together until forcibly disengaged, said receiving member being provided outwardly of said receiving recess with a second laterally elongated base portion bearing the other one of said adhesive surface fastening means of said pair thereof along the outer surface of said second base portion.

2. The fastener means of claim 1 wherein said laterally elongated receiving member is made of a resiliently deflectable material capable of elastic deformation whereby to permit enlargement of said laterally elongated slot when said bead portion is forced through said slot, into and out of said recess.

3. The fastener means of claim 1 wherein said laterally elongated receiving member is made of a resiliently deflectable plastic material capable of elastic deformation whereby to permit the enlargement of said laterally elongated slot when said bead portion is forced through said slot, into and out of said recess.

4. A selectively engageable and disengageable fastener means comprising: a pair of adhesive surface fastening means, each cooperable for adhesive fastening with respect to a surface portion of a corresponding different one of two auxiliary members which are adapted to be mounted in a desired relationship with respect to each other; and selectively engageable and disengageable intermediate resilient engagement means positioned between said pair of adhesive surface fastening means and comprising a mating pair of selectively and resiliently separable engagement elements, each firmly connected, respectively, relative to a different one of the pair of adhesive surface fastening means and being inwardly directed toward the other one of said mating engagement elements when in said engaged relationship with respect to each other; wherein one of said inwardly directed engagement elements comprises a pair of inwardly, forwardly extending laterally elongated projection members, each having an enlarged retaining bead portion carried at the inward, forward edge thereof and laterally elongated along the lateral length thereof and having a reduced-size interconnecting web portion extending outwardly from said bead portion, said interconnecting web portion being provided at the outer extremes thereof with a first common interconnecting laterally elongated base portion bearing one of said adhesive surface fastening means of said pair thereof along the outer surface of said first base portion, the other of said inwardly directed engagement elements comprising an inwardly, forwardly directed laterally elongated receiving member having and defining therein a pair of enlarged laterally elongated receiving recesses, each having positioned immediately forward, inward thereof a reduced-size resiliently enlargeable laterally elongated slot normally facing the corresponding one of said pair of bead portions for the forcible resilient reception thereof through said slot into said recess and positioned outward adjacent to said slot whereby to firmly and resiliently lock said pair of projection members and said pair of receiving recesses in said receiving member together until forcibly disengaged, said receiving member being provided outwardly of said pair of receiving recesses with a second common laterally elongated base portion bearing the other one of said adhesive surface fastening means of said pair thereof along the outer surface of said second base portion.

5. The fastener means of claim 1 wherein said laterally elongated receiving member is made of a resiliently deflectable material capable of elastic deformation whereby to permit enlargement of said laterally elongated slot when said bead portion is forced through said slot, into and out of said recess.

6. The fastener means of claim 4 wherein said laterally elongated receiving member is made of a resiliently deflectable plastic material capable of elastic deformation whereby to permit enlargement of said laterally elongated slots when said bead portions are forced through said slots, into and out of said recesses.

7. A selectively engageable and disengageable fastener means comprising: a pair of adhesive surface fastening means, each cooperable for adhesive fastening with respect to a surface portion of a corresponding different one of two auxiliary members which are adapted to be mounted in a desired relationship with respect to each other; and selectively engageable and disengageable intermediate resilient engagement means positioned between said pair of adhesive surface fastening means and comprising a mating pair of selectively, resiliently separable engagement elements, each firmly connected, respectively, relative to a different one of said pair of adhesive fastening means and being inwardly directed toward the other one of said mating engagement elements when in said engaged relationship with respect to each other; wherein the first of said inwardly directed engagement elements comprises a pair of inwardly, forwardly extending laterally elongated projection members, each having an enlarged retaining bead portion carried at the inward, forward edge thereof and laterally elongated along the lateral length thereof and having a reduced-size interconnecting web portion extending outwardly from said bead portion and provided at the outer extreme thereof with a first common interconnecting laterally elongated base portion bearing one of said adhesive surface fastening means of said pair thereof along the outer surface of said first base portion, the second of said inwardly directed engagement elements comprising an inwardly, forwardly extending laterally elongated projection member having an enlarged bead portion thereon carried at the inward, forward edge thereof and laterally elongated along the lateral length thereof and having a reduced-size interconnecting web portion extending outwardly from said bead portion and provided at the outer extreme thereof with a second laterally elongated base portion bearing the second of said adhesive surface fastening means of said pair thereof along the outer surface of said second base portion, said pair of inwardly, forwardly extending laterally elongated projection members defining therebetween a receiving access facing said bead portion of said second engagement element for forcible resilient reception thereof to firmly resiliently lock said bead portion of the second engagement element and said pair together until forcibly disengaged.

8. The fastener means of claim 7 wherein the second of said inwardly directed engagement elements is connected by a U-shaped portion adapted to extend about an end of the other auxiliary member from said second laterally elongated base portion to a portion bearing against the opposite base portion having a similar engagement element.

9. The combination comprising a selectively engageable and disengageable fastener means comprising a pair of adhesive surface fastening means and selectively engageable and disengageable intermediate resilient engagement means positioned between said pair of adhesive surface means and comprising a mating pair of selectively resiliently separable engagement elements each firmly connected, respectively, relative to a different one of a pair of adhesive fastening means and being inwardly directed toward the other one of said mating engagement elements when in said engaged relationship with respect to each other; wherein the first of said inwardly directed engagement elements comprises a pair of forwardly extending laterally elongated projection members, each having an enlarged retaining bead portion carried at the inward, forward edge thereof and laterally elongated along the lateral length thereof and having a reduced-size interconnecting web portion extending outwardly from said bead portion and provided at the outer extreme thereof with a first common interconnecting laterally elongated base portion bearing one of said adhesive surface fastening means of said pair thereof along the outer surface of said first base portion, the second of said inwardly extending laterally elongated projection members having an enlarged bead portion thereon carried at the inward, forward edge thereof and laterally elongated along the lateral length thereof and having a reduced-size interconnecting web portion extending outwardly from said bead portion and provided at the outer extreme thereof with a second laterally elongated base portion bearing the second of said adhesive surface fastening means of said pair thereof along the outer surface of said second base portion, said pair of inwardly extending laterally elongated projection members defining therebetween a receiving access facing said bead portion of said second engagement element for forcible resilient reception thereof to firmly resiliently lock said bead portion of the second engagement element and said pair together until forcibly disengaged; said pair of adhesive surface fastening means being adhesively fastened to a surface portion of a corresponding different one of two auxiliary members mounted in a desired relationship with respect to each other; and adhesively secured to one of said auxiliary members a windstrip which engages and holds in place the edge of the other of said auxiliary members.

References Cited

UNITED STATES PATENTS

| | | | |
|---|---|---|---|
| 2,940,149 | 6/1960 | O'Connor | 24—206 |
| 2,975,538 | 3/1961 | Murfin | 24—73 X |
| 3,130,464 | 4/1964 | Barlow | 24—208 |

WILLIAM FELDMAN, *Primary Examiner.*

E. SIMONSEN, *Examiner.*